Oct. 13, 1959     J. P. LONGWELL     2,908,485
PROCESS USING FLUIDIZED SOLIDS
Filed Nov. 27, 1956
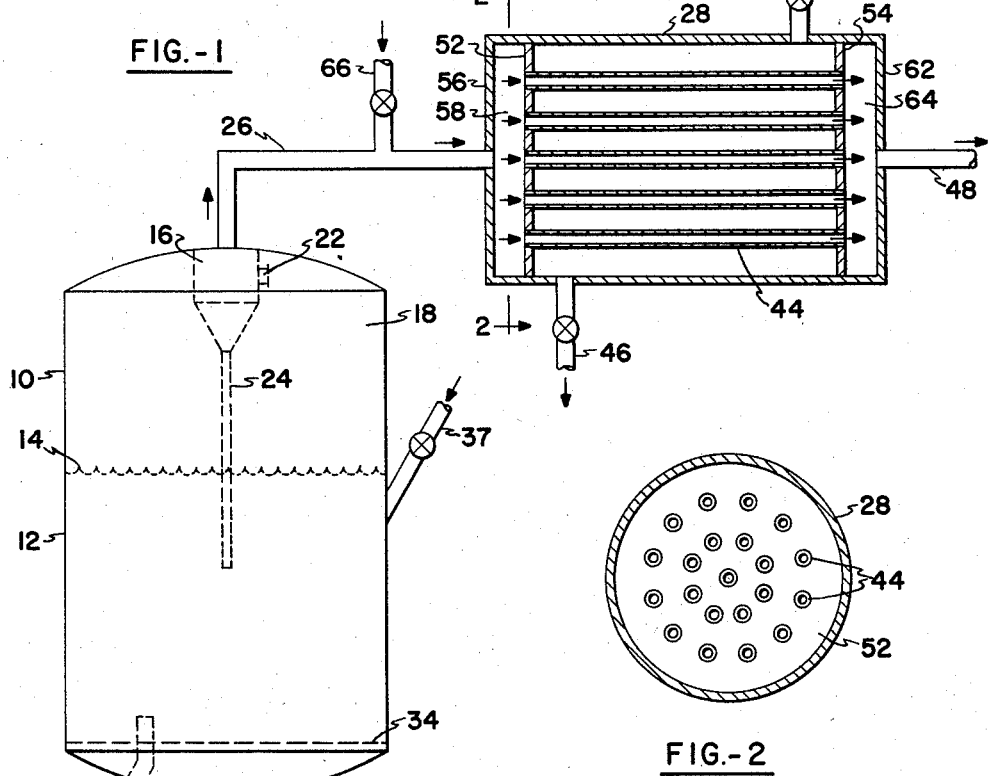
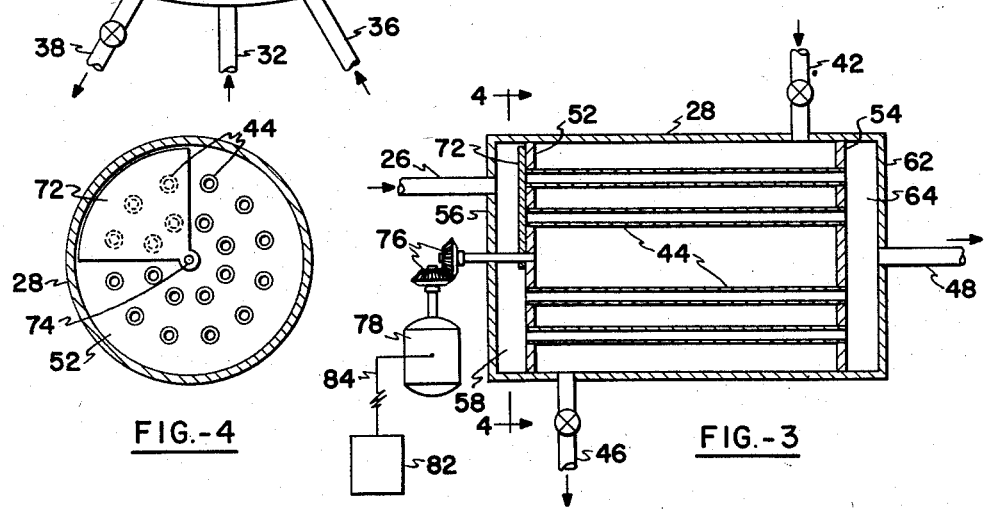
John P. Longwell    Inventor
By George Gilchrist    Attorney

United States Patent Office 2,908,485
Patented Oct. 13, 1959

2,908,485

PROCESS USING FLUIDIZED SOLIDS

John P. Longwell, Westfield, N.J., assignor to Esso Research and Engineering Company, a corporation of Delaware Application November 27, 1956, Serial No. 624,652

3 Claims. (Cl. 257—1)

This invention relates to fluid solids processes and particularly to the recovery of heat from gaseous or vaporous products of fluid solids processes.

The fluidized solids technique has been widely adapted for catalytic conversions such as the catalytic cracking, reforming or hydroforming of hydrocarbons and the like because of the advantages offered thereby of continuity of operation, uniformity of temperatures in the reaction and regeneration zones and the facility with which close control of all phases of the process is achieved and maintained.

In fluid catalytic processes, the recovery of heat from the hot gaseous or vaporous products formed in the process is extremely important to the overall economy of the processes. For example, the off-gases from a fluid solids regenerator are passed through a waste heat boiler to form steam for use in the process or plant. Furthermore, the reaction products leaving the main reaction or conversion zone are hot and may be used to preheat one or more of the feed streams to the reaction or conversion zone. In fluid hydroforming, for example, the hydroformate vapors leaving the reactor at about 875–950° F. are heat exchanged with fresh naphtha feed and/or recycle gas in a shell and tube heat exchanger to cool but not condense the hydroformate and to increase the temperature of the naphtha feed and/or recycle gas from ambient temperature or about 100° F. to about 400°–500° F.

Considerable difficulty has been encountered in the recovery of heat from hot gases from fluid catalytic processes because of fouling of the heat exchanger tubes. It has been found that the extremely fine catalyst particles that get by the cyclone separators or centrifugal separators tend to deposit or plate out upon the heat exchanger surfaces and greatly reduce the rate of heat transfer. For example, the vaporous hydroformate from a fluid hydroformer which contained only a very small amount of catalyst fines (about 100 lbs. per million cu. ft.) deposited a coating of catalyst fines in the tubes of the reactor overhead vapor heat exchangers in the course of two to three days sufficient to lower the reactor product side film heat transfer coefficient to about one tenth of the clean tube value. As a result, the overall coefficient for the exchangers dropped to about 40% of the design value in the same two to three day period thus seriously limiting heat exchange capacity.

It has been proposed to overcome this heat exchanger fouling problem by scouring or fluxing the catalyst fines from the tube surfaces by means of a coarse solid such as sand or the like on a continuous or intermittent basis. These additional facilities, however, add appreciably to the investment as well as the operating costs of the plant.

According to this invention an improved method is provided for recovering heat from hot gases from fluid catalytic processes. With this invention heat exchangers are operated to recover heat from hot gases from fluid catalytic processes in such a way that deposition or plating out of catalyst fines or dust upon the heat exchanger tubes will be minimized and the heat exchangers are maintained at substantially design capacities.

One method of preventing loss of heat exchange and for removing solid particles which have plated out on heat exchange surfaces is to temporarily cool the gas steam going to the heat exchanger below the temperature of the exchanger surface. Another method for removing solid particles adhering to heat exchange surfaces is to temporarily stop the gas flow through the heat exchanger to allow the gas to reach wall temperatures. A third method for removing solids from heat exchange surfaces is to temporarily stop the flow of cooling medium so that the heat exchange tubes may warm up to the gas temperature.

In the drawing:

Fig. 1 represents a reaction vessel and an associated heat exchanger for the overhead vapors or gases leaving the reaction vessel;

Fig. 2 represents a vertical transverse cross section taken substantially on line 2—2 of Fig. 1;

Fig. 3 represents a vertical longitudinal cross section of another form of heat exchanger adapted to be used in conjunction with a reaction vessel similar to the one shown in Fig. 1; and Fig. 4 represents a vertical transverse section taken substantially on line 4—4 of Fig. 3.

Referring now to the drawings, the reference character 10 designates a reaction vessel which is adapted to contain catalyst for catalytic reactions and which is shown in the drawing as a fluidized bed 12 of finely divided catalyst having a level indicated at 14. The reaction vessel 10 may be a catalytic cracking zone or vessel, a hydroforming or reforming zone or vessel, a thermal cracking zone or vessel or a shale distillation zone or vessel. In certain processes finely divided catalytically inert solids may be used instead of catalysts.

In cases where the finely divided solid has to be regenerated or reheated, the solid particles are passed to a regenerator or heater similar to the reaction vessel 10 shown in the drawing and then returned to the reaction zone or vessel at a higher temperature. The hot flue or combustion gases leaving the fluidized bed pass through a dust separating means such as a cyclone separator similar to that shown at 16 in Fig. 1. The gases leaving the cyclone separator still contain some entrained solids and as the gases are at an extremely high temperature, heat exchange is utilized to recover a large part of such heat. The heat exchanger may be a waste heat boiler in catalytic cracking or hydroforming.

In hydroforming, the hydroformed vaporous products in a vessel such as 10 pass upwardly into the dilute phase 18 superimposed on the dense fluidized bed and these vaporous products contain entrained solids even though the dilute phase 18 is of a much lower density than the fluidized bed 12. The vaporous hydroformed products then pass through inlet 22 of the cyclone separator 16 to separate most of the entrained solids from the vaporous products. The separated solids are returned to dense bed 12 through dip leg 24 of the cyclone separator 16 and the separated vapors pass overhead through line 26 into heat exchanger 28. While only one heat exchanger 28 is shown in the drawing it is to be understood that a plurality of heat exchangers can be used in parallel depending on the size of the plant. The vaporous products contain extremely fine solid particles not separated out in the cyclone separator 16 and when these vaporous products pass through a heat exchanger and strike a cold heat exchange surface or a surface at a much lower temperature, the dust particles or extremely fine particles contained in the vaporous or gaseous products migrate and stick to or are driven to the cold surface. The dust particles deposit on the cold surface and plate out and build up an insulating layer on the heat exchange surface thus fouling the heat exchanger and reducing the heat transfer coefficient.

In hydroforming, it is desirable to recover heat from the hydroformate vaporous products by heat exchanging them with naphtha feed and/or recycle gas containing a large proportion of hydrogen. The preheated naphtha feed is passed through line 32 into the bottom portion of reaction vessel 10 below horizontally arranged grid member 34. Hydrogen-containing gas may be introduced with the feed through line 32 or may be separately introduced through line 36 into the bottom portion of the reaction vessel 10. The superficial velocity of the naphtha feed vapors and the hydrogen-containing gas is selected to maintain the finely divided solid particles in vessel 10 in a dense fluidized turbulent condition as bed 12. Fresh or regenerated catalyst is introduced into the reaction vessel 10 through line 37 and spent catalyst is withdrawn from the dense fluidized bed 12 through line 38 and the spent catalyst may be discarded or passed to a regeneration zone or vessel for regeneration.

As above pointed out the present invention is adapted for use with any one of a plurality of processes utilizing finely divided inert or catalytic solids where a heat exchange step is involved and the hot vaporous or gaseous stream contains dust or finely divided solids, a large fraction of which are less than 5 microns in size. For example, in hydroforming of naphthas such as virgin naphthas having, typically, an initial boiling point between about 200° F. and 225° F. and a final boiling point between about 350° F. and 400° F. and having an octane number of about 45 (Research), the naphtha is passed through line 42 of the heat exchanger 28 around the heat exchanger tubes 44 and out through line 46 to be preheated to a temperature between about 400° F. and 500° F. The preheated naphtha is then passed through a furnace (not shown) and thence by line 32 into hydroforming vessel 10 for contact with finely divided hydroforming catalyst such as molybdenum oxide on alumina having a particle size mostly between about 10 and 125 microns with most of the material between 20 and 100 microns. The catalyst also contains some 0–5 micron size solids. Catalyst fines are formed in the unit by attrition during circulation of the catalyst. The amount of molbdenum oxide on the alumina support is about 10% with the remainder alumina. Other hydroforming catalysts such as chromia on alumina, platinum on alumina, cobalt molybdate on alumina, etc. may be used.

The hydroforming step is maintained at a temperature between about 900° F. and 975° F. and a pressure between about 50 p.s.i.g. and 400 p.s.i.g., usually 200 p.s.i.g. (pounds per square inch gage). The hydrogen-containing gas is supplied in a sufficient amount through line 36 to provide between about 2000 and 6000 cu. ft. of hydrogen per barrel of naphtha feed.

The hydroformate vapors pass through cyclone separator 16 to remove most of the entrained solids or catalyst particles and the separated hydroformate vapors passing overhead through line 26 contain between about 25 and 400 lbs. of 0–10 micron size particles per million cubic feet of gas or vapors. The hydroformate vapors at a temperature between about 850° F. and 950° F. pass through line 26 to the heat exchanger 28 where the vapors pass through the tubes 44 surrounded by feed naphtha around the tubes. The hydroformate vapors leave the heat exchanger 28 through line 48, at a temperature between about 600° F. and 675° F. and are passed to a fractionating system or other means to recover motor gasoline of high octane number. The feed naphtha enters at a temperature between about 100° F. and 200° F. and leaves the heat exchanger 28 through line 46 at a temperature between about 650° F. and and 750° F. The velocity of the gaseous hydroformate product passing through tubes 44 is about 50 ft./sec. but may be varied between about 10 and 100 ft./sec. It will be apparent that there is an appreciable temperature differential between the hydroformate vapors and the wall temperature of the metal heat exchange or cooling tubes. Under these conditions there is fouling of the tubes and this is caused by deposition or plating out of the extremely fine particles of about 0–5 microns on the inner walls of the tubes 44. The extremely fine particles stick tightly to the inner walls of the cooling tubes 44 and to each other.

Fouling of the inner walls of tubes 44 occurs rapidly when the gaseous stream being cooled contains substantially only extremely finely divided solids mostly below about 5 microns and not bigger than about 10 microns. With only about 1 pound of such finely divided material in about 10,000 cubic feet of gaseous hydroformate and differential temperatures as above given, there resulted a deposited coating of catalyst fines on the inner walls of the tubes 44 and in about three days the heat transfer coefficient dropped to about 40% of the design value.

Returning now to Fig. 1, the heat exchanger 28 is shown as a shell and tube exchanger of circular cross section and having end tube sheets 52 and 54 supporting the tubes 44. The tubes at their ends are fitted into tube sheets 52 and 54. The heat exchange tubes are arranged in spaced parallel relation. Tube sheet 52 is spaced from end 56 of the shell of the exchanger 28 to leave a space 58 into which vapors or gases pass from line 26 for distribution to the tubes 44. Tube sheet 54 at the other end is spaced from end 62 of the shell of the exchanger 28 to provide a space 64 for collecting cooled vapors and gases from the outlets of tubes 44 and for withdrawal through line 48.

To remove the deposited or plated out fines or extremely finely divided particles from the inner walls of the cooling tubes 44, according to this invention, the temperature gradient or differential between the inside and outside of tubes 44 is substantially reduced, temporarily eliminated or reversed and the dust will fall off. One method of removing the deposited dust is to temporarily cool the hot gas or vapor stream passing through line 26 below the temperature of the walls of the cooling tubes 44 and the dust will be swept away by the gas or vapor stream. This can be done by injecting water, naphtha or some other coolant into the gas or vapor stream upstream from the heat exchanger 28 as by introducing it into line 26 through line 66.

For example, in a fluid hydroforming process for processing 20,000 barrels of naphtha per day, about 17,000 barrels of hydroformate vapors mixed with hydrogen at a temperature of about 900° F. and a dust loading of 1 lb. (0–10 microns)/10,000 cubic feet of vapor pass through one or more lines 26 to a plurality of bundles of heat exchangers 28 and the average temperature of the walls of the tubes is about 675° F., and the temperature of the hydroformate vapors leaving through line 48 is about 610° F. After about 8 hours running, the temperature of the hydroformate vapors leaving through line 48 rose to about 635° F. and about 7 barrels of naphtha per minute were needed to lower the temperature of the hydroformate vapors to about 750° F. When this temperature was reached and maintained for about 3–15 minutes, the deposited film was loosened and swept away by the hydroformate vapors and the normal operation resumed, that is, without the addition of a cooling medium through line 66. It was necessary to clean the tubes of the deposit by this means about every 1 to 3 days. At the beginning of the operation the heat transfer coefficient was 70 B.t.u./hr./sq. ft./° F. and after fouling occurred in about 2 days the heat transfer coefficient fell to 40 B.t.u./hr./sq. ft./° F.

Another method of removing dust deposits from heat exchangers is to temporarily stop the flow of hot gas or vapor through one or more of the heat exchanger tubes 44. This will allow the hot gas or vapor in the tubes to come to wall temperature and this causes loosening and sweeping away of the deposit. This can be accomplished by a rotating baffle upstream from the heat exchanger which will block off a few of the tubes at a time and which will block each of the tubes at some part of its cycle. One form of apparatus to accomplish stopping of flow to certain of the tubes is shown in Figs. 3 and 4 where the same parts are designated by the same reference characters used in Fig. 1. The apparatus in Fig. 3 differs from that in Fig. 1 in the use of rotatable baffle 72 in the form of a quadrant of a circle. The baffle 72 is pivoted at 74 at the intersection of the radii of the quadrant on an axle or rod rotatably mounted in the center of end tube sheet 52 and extending through end wall 56 of the shell of the heat exchanger 28. Means diagrammatically shown at 76 and including a motor 78 and timing mechanism or control 82 connected electrically to motor 78 by line 84 are provided for actuating the rotatable baffle 72 at selected intervals.

As shown in the specific form in Fig. 4 there are included five tubes in each quadrant but this number is selected merely for illustration and for ease of showing rather than criticality and other numbers of tubes may be used. As above pointed out, when hot gases or vapors containing dust or extremely fine particles are passed through a heat exchanger, there is a deposit of fines on the inner wall of the cooling tube and this deposit is hard to remove. According to this form of the invention the baffle 72 is periodically rotated from one quadrant to the next to cover up and stop the flow of hot dust laden gases or vapors through the tubes in one quadrant. This will allow the gas or vapor in the tubes of the closed-off quadrant to cool off to wall temperature causing the deposit to loosen. The timing mechanism 82 actuates motor 78 and the motor through mechanical means such as gearing (not shown) moves the quadrant baffle a quarter of a turn to the next position where it stops the flow of gas or vapor through this section of tubes. The passage of hot gases or vapors through the uncovered section sweeps off the film or deposit laid down in this section.

In an example such as that above given in the first modification of the invention and using a hydroforming process as an example under the same conditions given above, the timing mechanism 82 is set to move the quadrant baffle once every 2 to 8 hours to thereby keep all the tubes clean and to maintain the heat transfer coefficient at a maximum.

In a third modification of the invention, the flow of the naphtha feed for preheating, or the flow of the medium being heated is temporarily stopped or diverted to another heat exchanger to permit the cooling tubes 44 to heat up to the gas or vapor temperature and so loosen the deposit or film of dust laid down on the inside of the heat exchange tubes as above described. This can also be done by sections if desired.

With the third modification, the flow through lines 42 and 46 is temporarily stopped to permit the tubes 44 to be heated up by the hot vapors or gases passing through the tubes and to loosen the deposited dust film which is removed by the hot gas or vapor passing through the tubes 44. In hydroforming in a 20,000 barrel unit using the catalyst above described, the hydroformate vapors passing through line 26 are at a temperature of about 900° F. and the hydroformate vapors leaving through line 48 or lines 48 are at a temperature of about 610° F. The naphtha feed enters at line 42 at a temperature of about 150° F. and leaves through line 46 at a temperature of about 850° F. After about 8 hours and with the conditions remaining the same, the temperature of the cooled vapors leaving through line 48 rose to about 635° F. indicating reduced heat transfer and fouling of the heat exchange tubes with fines. The valves in lines 42 and 46 were closed to shut off circulation of naphtha feed and the temperature of the exiting vapor in line 48 rose to about 875° F. in about 4 minutes and the inner walls of the tubes 44 were cleaned of the dust deposits. Then after about 5 minutes the valves in lines 42 and 46 were opened and fresh feed naphtha was again preheated. Where heat exchangers are run in parallel, the extra load can be put on the other exchanger temporarily.

The following data show that a heat exchanger fouled by dust particles may be cleared by allowing the temperature of the tube walls to rise. In all the runs, the solids loading rate to the heat exchange tube was 30 to 50 lbs. per million cubic feet of gas. The solid was a 10% molybdenum oxide on alumina hydroforming catalyst comprising 0–20 micron size particles but containing only small amounts of 15 to 20 micron size particles.

In one run, the hot air at a temperature of about 640° F. and at a velocity of about 42.5 ft./sec. entered and was passed through the heat exchange tube which was cooled with a water jacket to a temperature of about 110°–120° F. on the inside wall. The gas exiting from the heat exchange tube had a temperature of about 300° F. at the beginning of the run. After about 90 minutes, the temperature of the exit air had risen to about 315° F. indicating fouling of the tube. The tube was inspected and found to have a deposited film 0.2 millimeter thick. The cooling water was cut off from the water jacket and with the hot gas continuing to flow the temperature of the inside wall of the heat exchange tube rose to about 360° F.–380° F. in about 5 minutes and the deposited film disappeared.

The run was repeated using an inlet air temperature of about 540° F. In this run a film of dust was deposited and the temperature of the exiting air rose showing poorer heat transfer as a result of the deposited film of dust. When the cooling water was shut off as in the preceding example, the dust film disappeared. The same results were obtained using gas velocities of 6, 12, 25 and 50 ft./sec., that is, a film of catalyst fines was deposited on the inner wall of the tube when the tube was cool and the film was removed when the tube wall was heated. The deposition and removal of the solids film was faster at the higher velocities.

The specific examples above given include heat exchanging of relatively hot gases with a cooler heat exchange medium but the invention is not to be restricted thereto as hot gases or vapors at lower temperatures such as 200° to 400° F. may be heat exchanged indirectly with cooler heat exchange mediums. There is deposition of dust on the inner walls of heat exchange tubes where the temperature differential between the hot gas or vapor leaving the tube and the metal cooling surface is at least about 100° F. and may go as high as 400° F.

In catalytic cracking the catalyst may be any conventional cracking catalyst such as silica-alumina but other catalysts such as silica-magnesia-silica-alumina-zirconia, silica-alumina-magnesia and the like may be used. The catalysts are used in finely divided form with most of the particles being of an average size between about 20 and 100 microns and containing small amounts of 0–10 micron size particles.

The present invention is also useful in the coking of residual oil, high temperature cracking of heavy oils to produce ethylene and other unsaturated hydrocarbons along with aromatic hydrocarbons, thermal cracking with inert finely divided solids etc.

What is claimed is:

1. In a process for recovering heat from hot gaseous streams containing suspended solid dust particles below about 10 microns in size by indirectly contacting such a hot gaseous stream with a cooler heat exchange medium wherein said hot gaseous stream in passing through a heat exchange tube plates out dust particles on the wall of the tube thus reducing heat transfer through the wall of the tube, the improvement which comprises reducing the existing temperature differential between the tube wall and said hot gaseous stream in the tube at intervals without shutting down the flow of said hot gaseous stream through the heat exchange step to substantially equalize the temperature between said gaseous stream and the tube wall to loosen and sweep away the plated dust particles by said gaseous stream.

2. A process according to claim 1 wherein a coolant is added at intervals to said hot gaseous stream passing to said heat exchange tube to lower the temperature of said gaseous stream to substantially the temperature of the tube wall.

3. A process according to claim 1 wherein flow of the heat exchange medium is stopped at intervals to heat up the heat exchange tube so that its temperature is substantially equal to that of said gaseous stream.

References Cited in the file of this patent

UNITED STATES PATENTS

| 2,289,351 | Dixon et al. | July 14, 1942 |
| 2,493,494 | Martin | Jan. 3, 1950 |
| 2,725,217 | Hansen | Nov. 29, 1955 |